Figure 1:
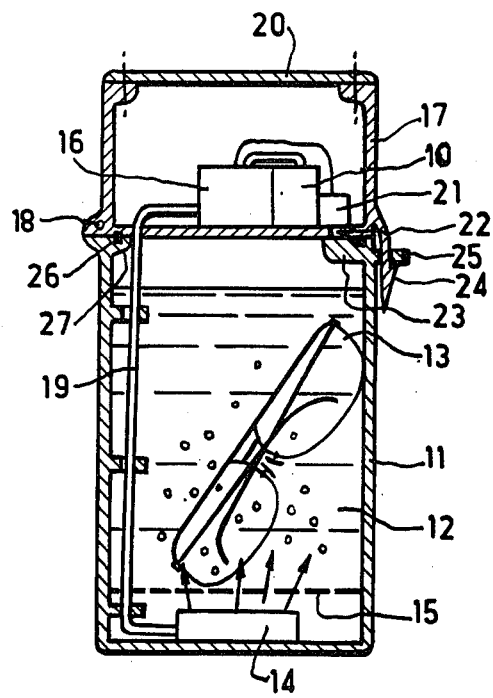

United States Patent [19]

Lapeyre et al.

[11] 4,314,766
[45] Feb. 9, 1982

[54] SPECTACLE CLEANING DEVICE FOR DOMESTIC USE

[75] Inventors: Guy Lapeyre, Paris; Jean Thiébaut, Creteil, both of France

[73] Assignee: Essilor International (Compagnie Generale d'Optique), Paris, France

[21] Appl. No.: 109,462

[22] Filed: Jan. 4, 1980

[30] Foreign Application Priority Data

Jan. 30, 1979 [FR] France .................. 79 02273

[51] Int. Cl.³ .................. B01F 13/02; B08B 11/00
[52] U.S. Cl. .................. 366/101; 366/347
[58] Field of Search .......... 366/101, 106, 251, 347, 366/349; 134/94, 102, 117, 166 R, 192; 68/183, 196; 261/121 M, 30, 121 R; 15/302; 233/1 B; 192/135

[56] References Cited

U.S. PATENT DOCUMENTS

| | | | |
|---|---|---|---|
| 1,414,727 | 5/1922 | Edmands | 192/135 |
| 2,601,198 | 6/1952 | Willson | 261/121 M X |
| 3,050,422 | 8/1962 | Zak | 134/94 X |
| 3,406,696 | 10/1968 | MacChesney et al. | 15/302 X |
| 3,450,391 | 6/1969 | Morris | 134/192 X |

Primary Examiner—Philip R. Coe
Attorney, Agent, or Firm—Burgess, Ryan and Wayne

[57] ABSTRACT

A spectacle cleaning device for domestic use comprises an open-ended container adapted to contain a liquid detergent and the spectacles to be cleaned, a movable cover for sealing the container, means for agitating the liquid detergent and means for actuating said agitating means. The latter may comprise either an air diffusor fed by a pressurized air generator, or a propeller driven by an electric motor.

3 Claims, 2 Drawing Figures

U.S. Patent      Feb. 9, 1982      4,314,766

SPECTACLE CLEANING DEVICE FOR DOMESTIC USE

The present invention relates to a spectacle cleaning device for domestic use. The term "spectacles", as used herein, designates the assembly constituted by a spectacle frame and the associated optical lenses mounted thereon, which lenses may be or may not be corrective lenses.

Spectacle cleaning devices are already known; however, these known appliances are generally adapted to be used on an industrial scale and are thus too expensive for an individual user who desires periodically to clean his or her spectacles with a view to keeping them in good condition. The known cleaning devices comprise a container adapted to contain a liquid detergent submitted to the effect of ultrasonic vibration with a view to enhancing its cleaning efficiency. The considerable cost of the ultrasonic generators used in these known devices is the main cause of the elevated price of such devices. It thus is not realistic to envisage the use of such ultrasonic generators in small cleaning devices for domestic use the cost of which must be as low as possible.

It is an object of the present invention to provide a spectacle cleaning device for domestic use of a particularly simple construction, which can be manufactured at very low cost and which is completely efficient for satisfactory spectacle cleaning without using an ultrasonic generator and without any risk of deteriorating even the most fragile parts of the spectacles, especially the so-called "nose-plates" or nasal support plates by which the spectacles are supported on the user's nose.

With this object in view the invention relates to a spectacle cleaning device comprising a container having an open top end and being adapted to contain a liquid detergent and the spectacles to be cleaned, a movable cover adapted to seal said container, means for agitating said detergent liquid, and means for activating said agitating means. In one embodiment of the invention the agitating means are constituted by an air diffusor, whereas said actuating means comprise a pressurized air generator adapted to feed said air diffusor and a generator actuating member operated in response to the closing of the container by means of said cover, in such a manner, that the generator is actuated when said container is sealed by said cover.

Preferably said agitating means are integrally mounted on the cover which constitutes, in this case, a movable casing.

Due to the combined action of the liquid detergent and the means for agitating the same, dust particles and/or impurities which may have reached locations that are not easily accessible for manual cleaning are eliminated, especially from the interval defined between the lenses and the associated rims of the frame, as well as from the area of attachment of the above-mentioned nasal support plates.

Manual cleaning by means of a special spectacle cleaning paper does not allow these dust particles or other impurities to be removed. When using a brush with a view to removing such particles and impurities there is a risk of dammaging the nasal support plates and scratching or scoring the lenses when the latter are made of an organic material.

The cleaning device according to the invention allows all these drawbacks inherent in manual cleaning to be overcome.

The invention will be described herein-below in more detail with reference to the appended drawing which is given by way of illustration, but not of limitation.

FIG. 1 of the drawing shows one embodiment of the spectacle cleaning device according to the present invention.

Figure 2:
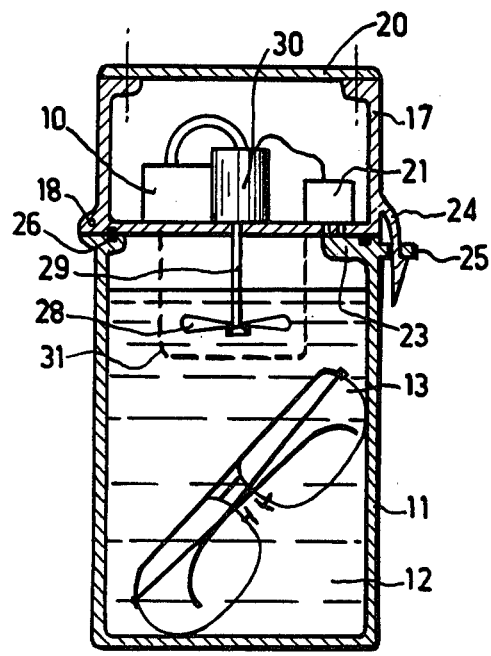

FIG. 2 represents another embodiment of the novel spectacle cleaning device.

The cleaning device according to the invention as shown in FIG. 1 comprises a container 11 having a cylindrical, parallelepipedic or elliptic shape, and the top end of which is open so as to allow a liquid detergent 12 and the spectacles to be cleaned, shown schematically at 13, to be introduced into said container.

Agitating means constituted by an air diffusor 14 are provided inside of the container 11 at the bottom part thereof. A grid 15 is mounted within the container above diffusor 14 so as to prevent any contact between spectacles 13 and the diffusor. Actuating means 16 for operating agitating means 14 comprise a pressurized air generator located within a casing 17 which is movable in respect to container 11 and is, for example, connected to the latter by a hinge 18 so as to constitute a cover for the container.

Air diffusor 14 is connected to air generator 16 by a flexible hose 19. A feeding source 10 for generator 16 is also mounted inside of casing 17, said source being adapted to feed the generator with electric direct current of a tension equal to or lower than 24 volts.

Pressurized air generator 16 may be constituted by a compressor, in a manner known per se.

Casing 17 is provided at its bottom end with a removable cover 20 so as to give easy access to the elements located within the casing.

The device is started by means of a contactor or switch 21 located within casing 17 and extending to the outside thereof through an aperture 22.

When container 11 is closed by casing 17 an actuating member such as a push-button associated to switch 21 engages a boss 23 provided in the top part of the container, whereby the device is started.

Casing 17 is maintained in position on container 11 by a tongue 24 integral with said casing and adapted to engage by a snap-like action an open lug 25 provided on container 11. The container is sealed by a sealing O-ring 26 maintained on an annular flange 27 of the container, said sealing ring being slightly squeezed by casing 17.

In FIG. 2, which shows another embodiment of the spectacle cleaning device according to the invention, elements similar or equivalent to those shown in FIG. 1 are designated by identical reference numerals.

In the embodiment represented in FIG. 2 the detergent liquid agitating means 28 are constituted by a propeller mounted on the end of a shaft 29 which is rotated by actuating means 30 located within casing 17, said actuating means comprising a direct current electric motor fed by current source 19. A protecting grid 31 is affixed to casing 17 so as to prevent any contact between spectacles 13 and propeller 28. With a view to facilitate the use of the cleaning device, the liquid detergent is preferably prepared by immersing a pastille or pellet of solid detergent substance which is dissolved in the water previously introduced into container 11.

The cleaning device may be equipped with a timing mechanism fed from current source 10 and provided with automatic zero-setting means, for limiting the maximum duration of the spectacle cleaning operation.

Casing 17 is connected to container 11 by a hinge 18. This hinge connection may be replaced by a maintaining system similar to system 24,25 described hereinabove.

The invention is not limited to the embodiments shown and described herein-before. Many variants and modifications may be envisaged by those skilled in the art without departing from the spirit and scope of the invention as defined in the appended claims.

What is claimed is:

1. A spectacle cleaning device comprising:
   an open top container for containing a liquid detergent and spectacles,
   a cover movable between a first position spaced from said open top of the container and a second position where it covers said open top,
   an air diffusor mounted in the container below the level of the liquid for air agitating said liquid detergent,
   an electrically energizable pressurized air generator for feeding pressurized air to said diffusor,
   an electric voltage supply,
   a push-button switch for controlling the energization of said generator by said supply, and
   fixed abutment means for depressing said push-button switch when the cover is moved to its second position, so as to activate said air generator.

2. The spectacle cleaning device of claim 1, wherein said cover is constituted by a movable casing which contains said air generator, the latter being connected to said diffusor by a flexible hose.

3. The spectacle cleaning device of claim 1, wherein said air generator is fed by an electric current source with a current at a voltage equal to or lower than 24 volts.

* * * * *